Figure 1:
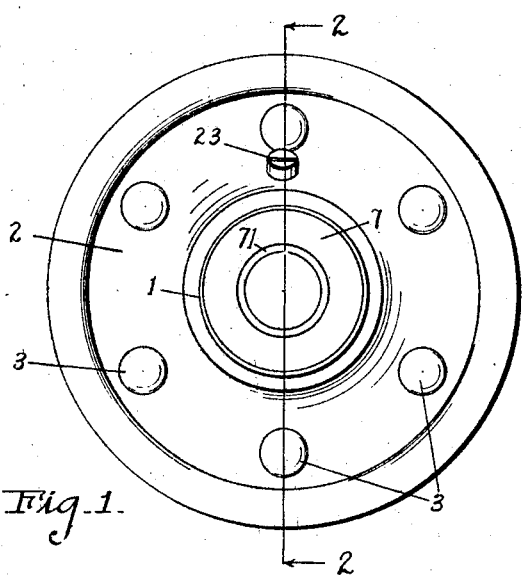
Figure 2:
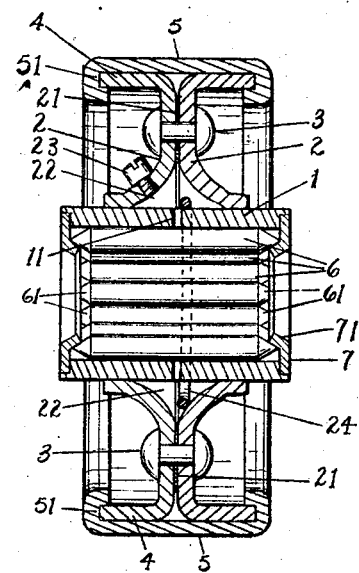
Figure 4:
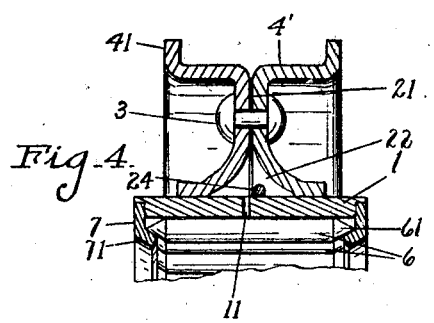
Figure 3:
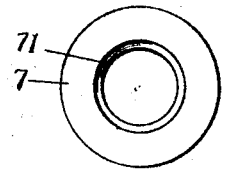

Nov. 2, 1926.  
L. D. BENEDICT  
1,605,206  
FABRICATED METAL WHEEL FOR TRUCKS  
Filed August 24, 1925

INVENTOR  
Laurance D. Benedict  
BY Chappell & Earl  
ATTORNEYS

Patented Nov. 2, 1926.

1,605,206

UNITED STATES PATENT OFFICE.

LAURANCE D. BENEDICT, OF GRAND RAPIDS, MICHIGAN.

FABRICATED METAL WHEEL FOR TRUCKS.

Application filed August 24, 1925. Serial No. 52,103.

This invention relates to improvements in fabricated metal wheels for trucks.

The objects of the invention are:

First, to provide a strong wheel especially adapted to dry kiln trucks and truck use.

Second, to provide such a wheel which is especially well adapted for retaining bearing rollers with effective lubrication.

Third, to provide such a wheel with an improved tread device.

Objects pertaining to details and economies of my invention will definitely appear from the detailed description to follow.

I accomplish the objects of my invention by the devices and means described in the following specification. The invention is clearly defined and pointed out in the claims.

A structure embodying the features of my invention is clearly illustrated in the accompanying drawing forming a part of this application, in which:

Fig. I is an elevation view of a wheel embodying the features of my invention.

Fig. II is a vertical sectional view on a line 2—2 of Fig. I showing details of construction.

Fig. III is a detail view of the bearing roller retaining disk.

Fig. IV is a detail sectional view corresponding to the sectional view of Fig. II showing the structure modified without the special tread and flanged for dry kiln truck use.

In the drawing the sectional views are taken looking in the direction of the little arrows at the ends of the section lines and similar numerals of reference indicate similar parts in all of the views.

The parts of the drawing will be identified by their numerals of reference. 1 is the hub which is of tubular form of steel to form a bearing for the bearing rollers inside. The web of the wheel is made up of symmetrical disks 2, 2 exactly similar riveted together at intervals by rivets 3, 3 and expanded toward the hub to form a chamber 22 for the oil. A screw plug 23 gives access to the oil chamber. An oil ring 24 is disposed within the chamber. The hub is perforated at 11 to permit oil to pass to the roller bearing chamber.

The outer periphery of the disk is spun or stamped outwardly to form the tread 4 around which is formed the reinforcing tread member 5, being spun over the tread flanges at 51, see particularly Fig. II. This makes a very strong truck wheel.

Bearing rollers 6 with tapered ends 61 are disposed wthin the bearing chamber of the hub. These are retained by the disks 7 countersunk into the hub ends and having the annular retaining lips 71 spun inwardly to engage over the outer edges of the rollers and retain them in place.

A gasket 21 may be inserted between the two disks 2, 2 to completely seal the oil chamber 22. This, however, is not required for ordinary use.

Where the wheel is used for dry kiln truck purposes the outer tread reinforce 5 is omitted and the tread 4' is expanded into wheel flanges 41, see Fig. IV where the modification appears. The tread 4' corresponds to the tread 4.

I have described my invention in the form in which I prefer it and I desire to claim the same specifically and broadly as pointed out in the appended claims.

Having thus described my invention what I claim as new and desire to secure by Letters Patent is:

1. In a fabricated metal wheel, a seamless tubular hub with a roller chamber inside, and symmetrical flanged disks suitably riveted together to form the web of the wheel, the outer edges of which are out-turned to form the tread and the central part being turned out at the hub, and frictionally engaging the same by drive fit coacting as specified.

2. In a fabricated metal wheel, a seamless tubular hub with a roller chamber inside, symmetrical flanged disks suitably riveted together to form the web of the wheel, the outer edges of which are out-turned to form the tread and the central part being turned out at the hub, and frictionally engaging the same by drive fit and a reinforcing tread member with its outer ends spun over the extended tread, coacting as specified.

3. A fabricated wheel with a seamless tubular hub with oil holes, an annular oil chamber centrally around the same, and a freely supported ring in the said annular chamber surrounding said hub.

In witness whereof I have hereunto set my hand.

LAURANCE D. BENEDICT.